(12) United States Patent
Kawaji et al.

(10) Patent No.: US 7,699,511 B2
(45) Date of Patent: Apr. 20, 2010

(54) DOOR MIRROR WITH TURN LAMP

(75) Inventors: Yasushi Kawaji, Ota (JP); Noriyuki Ito, Ota (JP); Hitoshi Kurihara, Ashikaga (JP); Yosuke Fukasawa, Ota (JP); Masashi Fukui, Ashikaga (JP); Tatsuya Sugamoto, Okazaki (JP); Hideo Hamamoto, Toyota (JP); Hirofumi Nishikawa, Okazaki (JP)

(73) Assignees: Mitsuba Corporation, Kiryu-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 106 days.

(21) Appl. No.: 11/907,089

(22) Filed: Oct. 9, 2007

(65) Prior Publication Data

US 2008/0089080 A1 Apr. 17, 2008

(30) Foreign Application Priority Data

Oct. 11, 2006 (JP) .............................. 2006-277104

(51) Int. Cl.
*B60Q 1/26* (2006.01)
*B60R 1/12* (2006.01)
*F21V 9/00* (2006.01)

(52) U.S. Cl. ...................... 362/494; 362/511; 362/509; 362/487; 362/459

(58) Field of Classification Search ................. 362/494, 362/511
See application file for complete search history.

(56) References Cited

U.S. PATENT DOCUMENTS

| | | | | |
|---|---|---|---|---|
| 6,619,820 | B2* | 9/2003 | Li ................. | 362/302 |
| 6,637,917 | B2* | 10/2003 | Schwanz et al. ............ | 362/487 |
| 7,255,464 | B2* | 8/2007 | Rodriguez Barros et al. ......... | 362/494 |
| 7,357,542 | B2* | 4/2008 | Waldmann ............... | 362/494 |
| 7,357,549 | B2* | 4/2008 | Gunther .................. | 362/551 |
| 2004/0202003 | A1* | 10/2004 | Lyst, Jr. .................. | 362/511 |
| 2006/0146555 | A1* | 7/2006 | Inaba ...................... | 362/494 |

FOREIGN PATENT DOCUMENTS

| | | |
|---|---|---|
| JP | U-5-71883 | 9/1993 |
| JP | A 2000-103287 | 4/2000 |
| JP | A-2003-63304 | 3/2003 |
| JP | A 2004-291671 | 10/2004 |
| JP | A-2005-267928 | 9/2005 |

\* cited by examiner

*Primary Examiner*—Jong-Suk (James) Lee
*Assistant Examiner*—David R Crowe
(74) *Attorney, Agent, or Firm*—Oliff & Berridge, PLC

(57) ABSTRACT

A turn lamp includes a base housing; a light source unit incorporated with a light source and housed in the base housing; an inner housing provided with a long and solid light guide; a lens cover that covers the base housing; and a diffused reflection generator that is structured such that light from the light source leaks out long from the light guide.

18 Claims, 5 Drawing Sheets

DOOR MIRROR WITH TURN LAMP

CROSS-REFERENCE TO RELATED APPLICATION

This application claims priority from Japanese Patent Application No. 2006-277104, filed Oct. 11, 2006, the entire disclosure of which is incorporated herein by reference in its entirety.

BACKGROUND

The present invention relates to a turn lamp.

Recently, there has been provided a turn lamp (direction indicator) that is mounted on a door mirror of a vehicle and is lit in conjunction with turn lamps provided at the front and rear of a vehicle. The turn lamp is used to further direct people around the vehicle to the driving intention of a driver. In such a construction, as light sources, light-emitting diodes (LEDs) that are excellent in durability and have strong directionality are sometimes used.

Conventionally, in order to satisfy legal requirements, a proposed door mirror is constructed so that only an outer part in the left and right direction of a vehicle lights up (see Japanese Published Unexamined Patent Application No. 2000-103287, for example). However, in recent years where design properties are regarded as important, it has been demanded that a front part of a door mirror, in a direction opposite to the disposition part of a mirror of the door mirror, lights up across the entire area in the left and right direction. A proposed door mirror is thus constructed so that a front lower part thereof lights up across the entire area in the left and right direction (see Japanese Published Unexamined Patent Application No. 2004-291671, for example).

SUMMARY

As well as requiring a large number of light-emitting diodes, the door mirror according to Japanese Published Unexamined Patent Application No. 2004-291671, however, has a complicated shape and structure. Not only is the number of components increased, but also an incorporating operation becomes troublesome and difficult, resulting in a high cost, wherein exists a problem to be solved by the present invention. The present invention also can achieve various other advantages.

The disclosure addresses an exemplary aspect in which a turn lamp includes a base housing; a light source unit incorporated with a light source and housed in the base housing; an inner housing provided with a long and solid light guide; a lens cover that covers the base housing; and a diffused reflection generator that is structured such that light from the light source leaks out long from the light guide.

In another exemplary aspect, the light source is disposed at, at least, one longitudinal end portion of the light guide.

In another exemplary aspect, the diffused reflection generator is constructed by forming a non-smooth surface on a surface of the light guide on a disposition side of the light source unit.

In another exemplary aspect, the diffused reflection generator is constructed by forming a reflection film on a surface of the light guide on a disposition side of the light source unit.

In another exemplary aspect, the diffused reflection generator is constructed by disposing the light source in an inclined manner with respect to a longitudinal direction of the light guide.

In another exemplary aspect, the diffused reflection generator is constructed by forming the light guide in a curved shape.

In another exemplary aspect, for the inner housing, integrally formed are the light guide and an extended portion that is extended in a direction orthogonal to a longitudinal direction of the inner housing.

In another exemplary aspect, for the light guide, a light scatteror is provided at, at least, one longitudinal end portion.

In another exemplary aspect, the light scatteror is constructed by forming a light entering portion in a spherical shape.

According to various exemplary aspects of the disclosure, a turn lamp excellent in visibility and design properties can be realized with a small number of light sources.

According to various exemplary aspects of the disclosure, the number of light sources can be reduced, and the construction can be simplified to contribute to a reduction in cost.

According to various exemplary aspects of the disclosure, processing can be simply and easily carried out.

According to various exemplary aspects of the disclosure, the construction can be simplified.

According to various exemplary aspects of the disclosure, a turn lamp excellent in design properties can be provided.

According to various exemplary aspects of the disclosure, a turn lamp further excellent in visibility and design properties can be provided.

BRIEF DESCRIPTION OF THE DRAWINGS

Various embodiments of the invention will be described with reference to the drawings, wherein.

DETAILED DESCRIPTION OF EMBODIMENTS

Figure 1A:
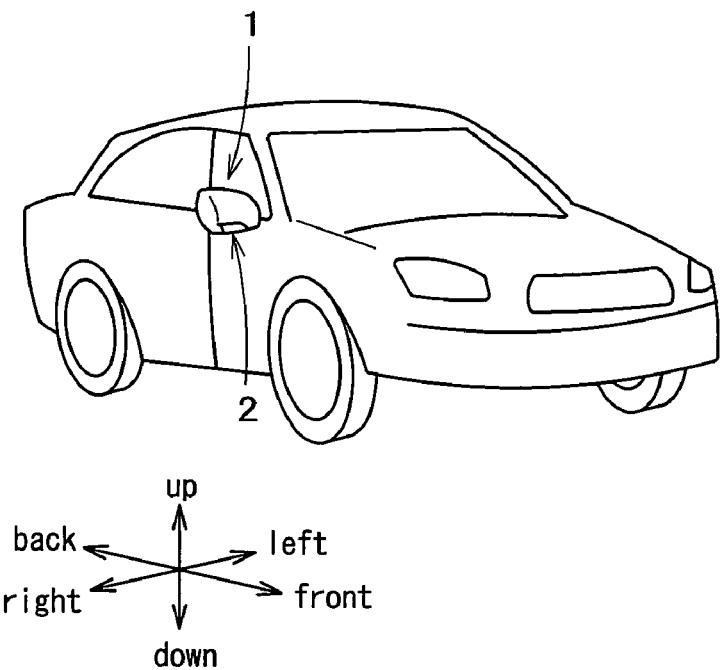
FIG. 1A is an overall perspective view of a vehicle.
Figure 1B:
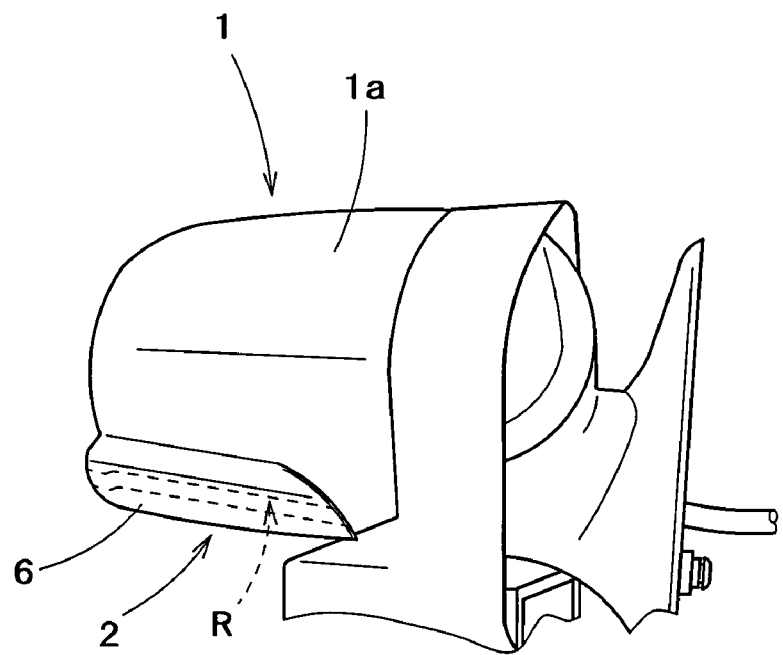
FIG. 1B is an overall perspective view of a door mirror.

Next, embodiments of the present invention will be described based on the drawings. In FIGS. 1A and 1B, reference numeral 1 denotes a door mirror provided on a vehicle, and an opening portion is formed at a part (not shown) of a body 1a of the door mirror 1 facing rearward, and in the opening portion, a rearward viewing mirror is fitted so as to be freely positioned. A part of the body 1a facing forward is formed in a manner bulging out forward, and in a lower part of the bulging portion, a turn lamp 2 in which the present invention is carried out is integrally incorporated.

Although door mirrors 1 are ones that are symmetrical left to right and provided on left and right door bodies of a vehicle, a description here will be given of the door mirror 1 provided on the right side of a vehicle in accordance with the directionality as shown in FIG. 1A, and another description of the door mirror 1 on the left side will be omitted.

The turn lamp 2 to be incorporated in the door mirror 1 is set so as to be incorporated in the body 1a as an assembly at the lower part of the forwardly bulging portion of the body 1a. A base housing 3 of the turn lamp 2 is constructed with a body portion 3a that is integrally molded from a non-translucent resin material, long in the left and right direction, and formed in a concave shape opened at the front and having a bottom surface at the rear. The base housing 3 also has a bent portion 3b that is extended rearward from a left end portion of the body portion 3a and is formed in a concave shape opened at the right and having a bottom surface at the left. In the base housing 3, formed is a concave portion 3c, communicated from the front to the right and having a bottom surface at the inside (from the rear to the left) of a front part of the body 1a, formed so as to be long in the left and right direction.

Figure 2:
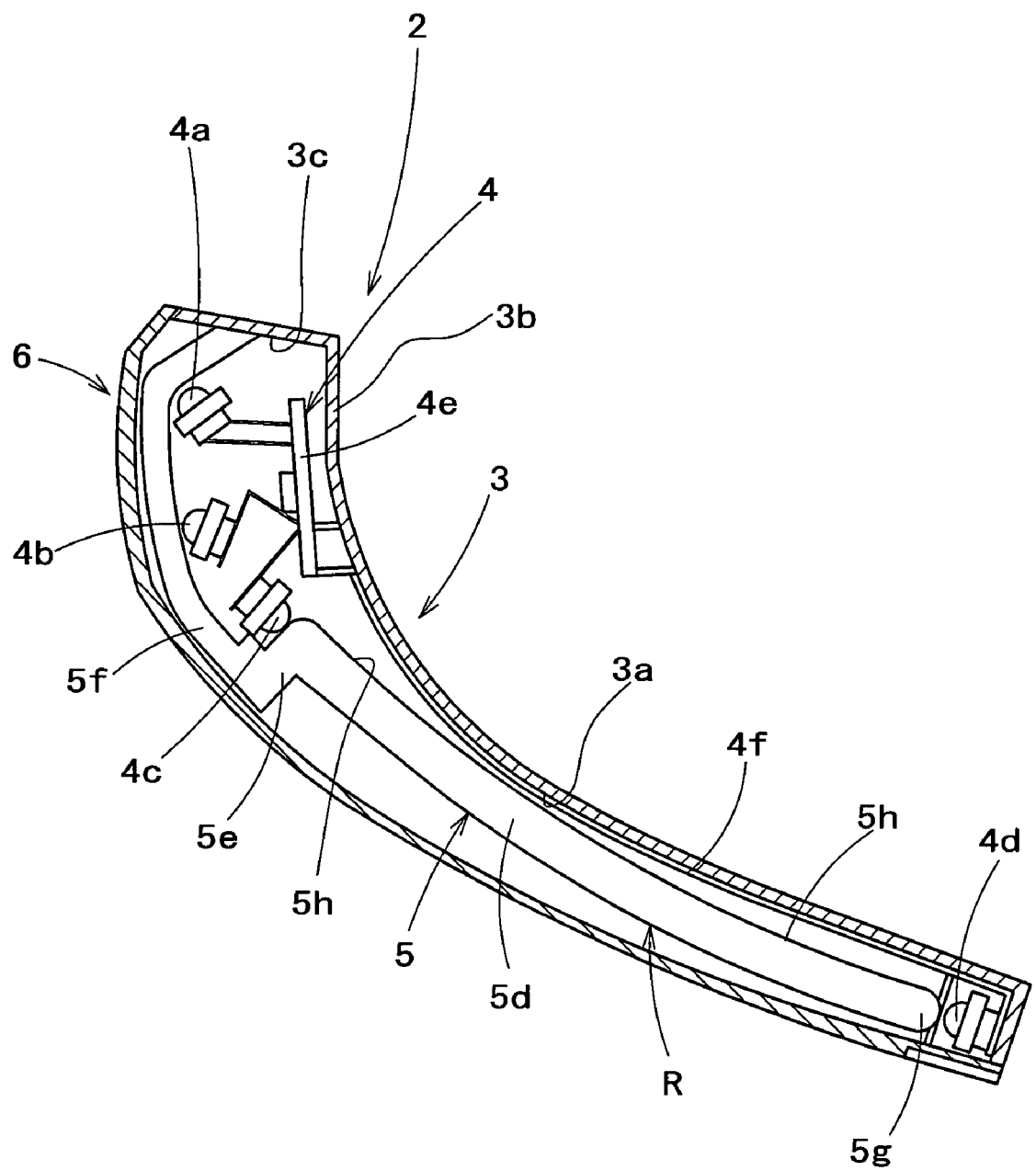
FIG. 2 is a side view of a turn lamp.

Reference numeral 4 denotes a light source unit, which is constructed so as to be incorporated in a housed state in the concave portion 3c that is formed at the front in the base housing 3 (see FIG. 2). The light source unit 4 is constructed with a plurality of (four in the present embodiment) first to fourth light sources 4a, 4b, 4c, and 4d and a member such as a substrate 4e that supports and electrically connects these light sources 4a, 4b, 4c, and 4d. The substrate 4e is set so as to be housed in the bent portion 3b of the base housing 3, and the first to third light sources 4a, 4b, and 4c are disposed while being located at the disposition part of the substrate 4e. Furthermore, a bus bar 4f is extended leftward from the substrate 4e, and in a state connected to the substrate via the bus bar 4f, the fourth light source 4d is connected to an extended front end portion of the bus bar 4f, and the fourth light source 4d is disposed so as to be located at a part opposing a left end portion of the base housing 3. Although, in the present embodiment, light-emitting diodes (LEDs) are used as the light sources, lamps such as incandescent lamps may be used.

Figure 3:
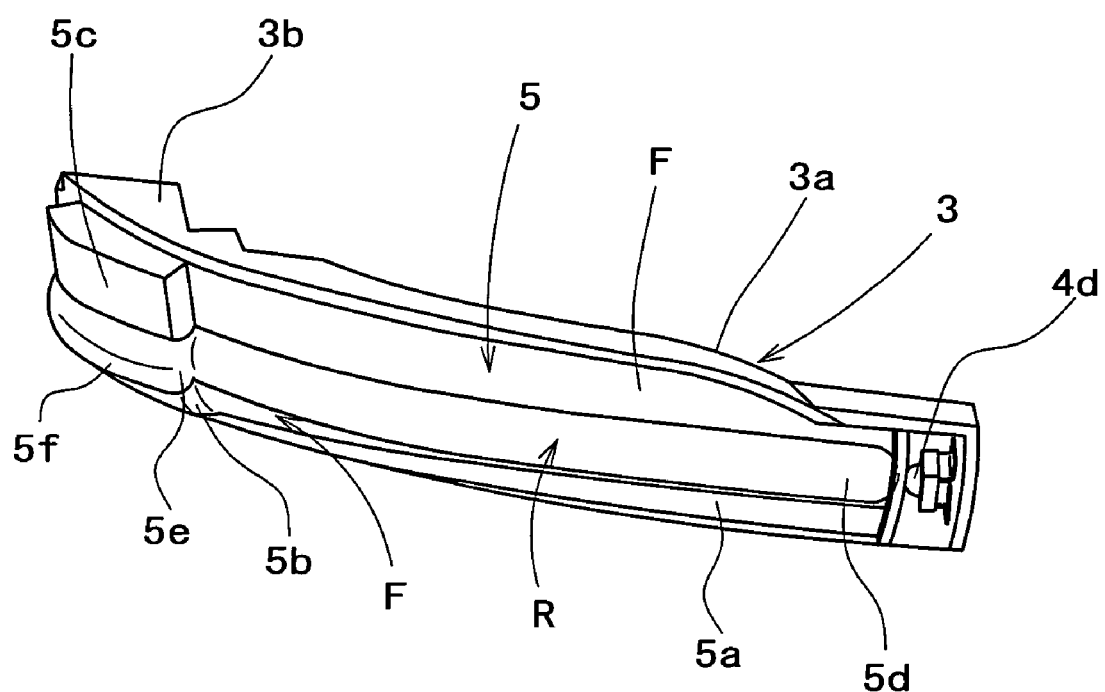
FIG. 3 is a perspective view of a base housing, a light source unit, and an inner hosing in an incorporated state.

Reference numeral 5 denotes an inner housing in which the present invention is carried out, and the inner housing 5 is set so as to be incorporated to block the concave portion 3c of the base housing 3 in which the light source unit 4 has been housed (see FIG. 2). The inner housing 5 is integrally molded from a translucent resin material in a curved shape in a plan view, long in the left and right direction, opened at the rear, and formed in a manner bulging out forward. And, the inner housing 5 is constructed with a body portion 5a formed in a curved shape in a plan view, a step portion 5b protruding forward at a left end portion of the body portion 5a, and a bent portion 5c extended rearward from the step portion 5b, opened at the left, and formed in a manner bulging out rightward (see FIG. 3).

Furthermore, for the inner housing 5, formed in a protruding and continuing state at intermediate portions in the up-and-down direction of the body portion 5a, the step portion 5b, and the bent portion 5c, respectively, are a solid semicircular-shaped body portion light guide 5d, step portion light guide 5e, and bent portion light guide 5f that are protruding from their respective outer surfaces (front surfaces, right lateral surfaces) outward (forward to rightward) and irradiated with light from the respective light sources 4a, 4b, 4c, and 4d. These light guides 5d, 5e, and 5f are integrally formed long at the respective parts 5a, 5b, and 5c correspond to a light guide R (see FIG. 4). In this manner, by forming the light guide R at the intermediate portion in the up-and-down direction of the inner housing 5, provided is a state where extended portions F extended in a direction orthogonal to the longitudinal direction of the light guide R are formed at upper and lower edge portions of the light guide R, and these extended portions F can cover the base housing 3 and light source unit 4 to be members located behind the light guide R.

Figure 5A:
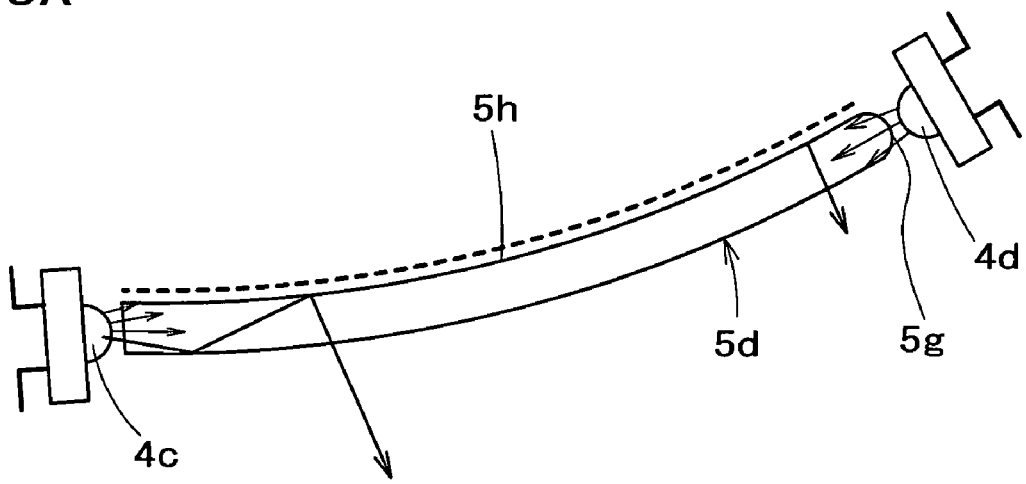
FIG. 5A is a pattern view for explaining a leaking state of a light guide of the body portion.

And, a left end portion of the body portion light guide 5d serving as one (left side) longitudinal end portion of the light guide R is constructed as a light entering portion 5g, the light entering portion 5g is formed in a spherical shape of a hemisphere further divided into two parts, and the spherical-shaped construction serves as a light scatteror of the present invention (see FIG. 5A). And, as will be described later, it is set so that as a result of light from the fourth light source 4d entering from the light entering portion 5g, the light is made incident into the light guide R in a scattered state.

In addition, texturing is applied to surfaces (inner lateral surfaces) on the light source unit 4 side of the respective portions 5a, 5b, and 5c of the inner housing 5, that is, an inner lateral surface (rear lateral surface and left lateral surface) 5h of the light guide R and extended portions F, whereby it is set so that the inner lateral surface 5h is formed as a non-smooth surface in contrast to the an outer lateral surface (front lateral surface) constructed as a smooth surface, thereby constructing a diffused reflection generator of the present invention. And, it is set so that, when light that has entered the light guide R was made incident into the inner lateral surface 5h, by diffusely reflecting the incident light by the inner lateral surface 5h, the diffusely reflected light is efficiently leaked (radiated) from the entire longitudinal area of the outside (front, right) of the light guide R.

And, in an incorporated state of the base housing 3, the light source unit 4, and the inner housing unit 5 constructed as such, the first light source 4a of the light source unit 4 is disposed while being located at a part to irradiate a right end part of the bent portion light guide 5f of the inner housing 5 from the left (inside), and the second light source 4b, at a part to irradiate a longitudinal intermediate portion of the bent portion light guide 5f from the inside, and the third light source 4c, at a part to irradiate a right end portion of the body portion light guide 5d from the right direction, and the fourth light source 4d, at a part to irradiate the left end portion of the body portion light guide 5d from the left.

Figure 4A:
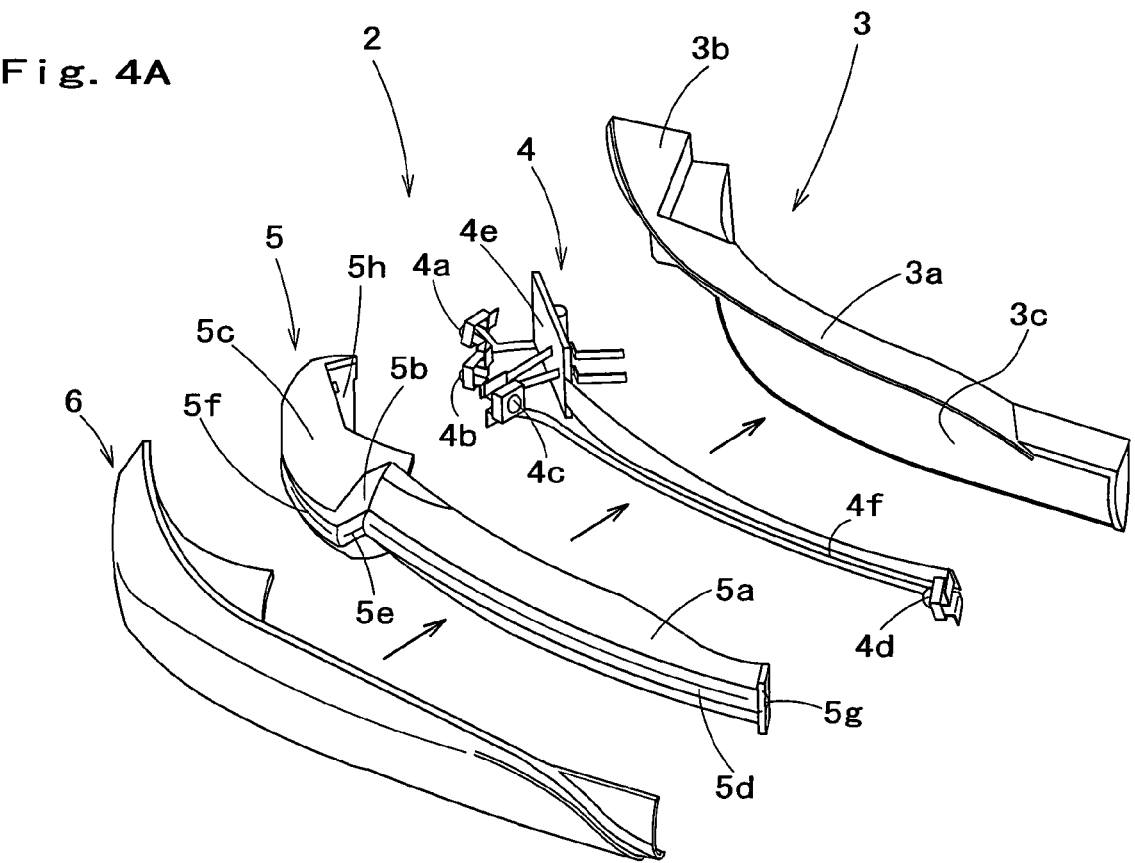
FIG. 4A is an exploded perspective view of the turn lamp.
Figure 4B:
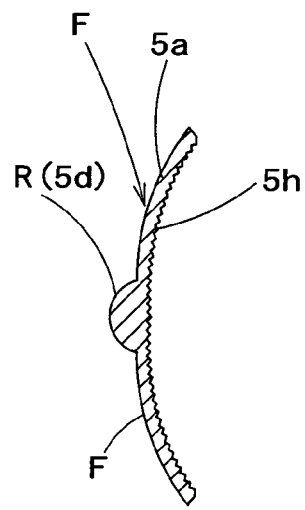
FIG. 4B is a longitudinal sectional view of a body portion of the inner housing.

Also, reference numeral 6 denotes a lens provided in a sealing manner at the opening of the base housing 3 so as to cover the light source unit 4 housed in the base housing 3 and the inner housing 5, and the lens 6 is integrally molded from a translucent resin material (see FIG. 4A).

In the turn lamp 2 constructed as such, it is set so that, when power is fed to the first to fourth light sources 4a, 4b, 4c, and 4d of the turn lamp 2 to light up, the first and second light sources 4a and 4b irradiate the bent portion light guide 5f located outward in the left and right direction of the turn lamp 2, that is, a right end side as legally required, whereby the bent portion light guide 5f leaks out light that satisfies legally required illuminance rightward.

Further, at this time, the third and fourth light guides 4c and 4d irradiate the left and right end portions of the body portion light guide 5d from outward in the left and right direction, respectively, and light that enters the body portion light guide 5d becomes a light long in the left and right direction as a result of leaking out from the entire longitudinal area of the body portion light guide 5d based on the light scatteror and diffused reflection generator to be radiated forward, whereby it is set so that the light guide R leaks light from the whole from a right part to a front part thereof.

Here, description will be given of leakage of light from the body portion light guide 5d via the light scatteror and diffused reflection generator by use of a pattern view of FIG. 5A.

Light from the third light source 4c enters rightward in the drawing, and in this case, the light enters (is made incident into) the body portion light guide 5d with a predetermined angle range based on directionality of the third light source 4c. Therefore, of the light entering the body portion light guide 5d, as shown by the arrows at a left side part of FIG. 5, light reflected on an outer lateral surface of the body portion light guide 5d is reflected on the inner lateral surface 5h applied with a diffused reflection generator to leak out from an intermediate portion in the left and right direction of the body portion light guide 5d, whereby leakage of light from the whole longitudinal area of the body portion light guide 5d is promoted, so that a turn lamp 2 that is high in visibility at the body portion light guide 5d can be provided.

Figure 5B:
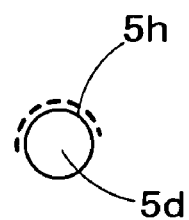
FIG. 5B is a longitudinal sectional view of FIG. 5A.

In addition, as a result of light from the fourth light source 4d being made incident into the body portion light guide 5d via the spherical-shaped light entering portion 5g in which a light scatteror is carried out, as shown by the arrows at a right side part of FIG. 5, the light from the fourth light source 4d is made incident at a wide-ranging incident angle, and leakage of light from the whole longitudinal area of the body portion light guide 5d is promoted in conjunction with the diffused reflection generator, so that a turn lamp 2 that is high in the degree of visibility at the body portion light guide 5d (from a forward part of the vehicle) can be provided.

Furthermore, since the body portion light guide 5d is formed in a curved shape having a center on the inner lateral surface 5h side, the light from the third and fourth light sources 4c and 4d does not pass therethrough to the opposing side and can be diffusely reflected on the inner lateral surface 5h, and leakage of light from the whole longitudinal area of the body portion light guide 5d is further promoted.

In this connection, in the present embodiment, for making light leak out from the whole longitudinal area of the body portion light guide 5d, the light sources 4c and 4d are provided on both longitudinal end portions. However, it is not always necessary to provide the light sources on both end portions, and for example, even when only the fourth light source 4d is provided, visibility from a forward part of the vehicle can be enhanced.

Furthermore, therein, the inner housing 5, for which the extended portions F are formed on and under the light guide R that leaks light, is disposed so as to cover the front of the base housing 3 and the light source unit 4, and the inner lateral surface 5h of the inner housing 5 is applied with texturing and is thereby formed as a non-smooth surface. Thereby, it is set so that, even in a lighting condition where light leaks out forward from the light guide R of the inner housing 5, the light source unit 4 and the base housing 3 behind the inner housing are not seen through.

In the present embodiment constructed as described, the turn lamp incorporated in the door mirror 1 can be, as a result of light leaking out, from the light guide R integrally formed on the inner housing 5, long in the left and right direction not only toward an outer end part in the left and right direction legally required but also toward a forward part of the vehicle, provided as a turn lamp 2 that can enhance visibility of the vehicle from the front and is excellent in design properties. In this case, it is not necessary to provide a large number of light sources to irradiate the light guide R of the turn lamp 2 as in the conventional art. The light sources can be carried out by a small number of light sources (first to fourth light sources 4a, 4b, 4c, and 4d). As a result, the shape of the inner housing 5 can be simplified, and furthermore, the construction can be simplified, and the incorporating operation becomes easy to contribute to a reduction in cost.

Furthermore, it is sufficient to provide the light source to leak light from the whole longitudinal area of the body portion light guide 5d at, at least, one longitudinal end portion of the body portion light guide 5d. It thus becomes possible to reduce the number of light sources, so that the construction can be further simplified.

Also, therein, as the diffused reflection generator, the inner lateral surface 5h of the light guide R is processed by texturing or the like and is thereby formed as a non-smooth surface, so that processing can be simply and easily carried out.

Further, therein, as the diffused reflection generator, since the body portion light guide 5d is formed in a curved shape, while the inner lateral surface 5h of the body portion light guide 5d is formed as a non-smooth surface, the effect based on the diffused reflection generator can be further enhanced. Leakage from the body portion light guide 5d is further promoted regardless of having a small number of light sources (third and fourth light sources 4c and 4d), so that a turn lamp 2 that is further excellent in visibility and design properties can be provided.

Moreover, therein, the light guide R is integrally molded on the inner housing 5, and the base housing 3 and the light source unit 4 are covered by the extended portions F of the inner housing 5. Thus, the members behind the light guide R such as the light source unit 4 are not exposed, and the design ability is further improved.

Also, therein, the light entering portion 5g of the body portion light guide 5d is formed in a spherical shape, and light from the fourth light source 4d is made to enter the body portion light guide 5d in a scattered manner. Leakage of light from the body portion light guide 5d is further efficiently carried out, and visibility and design properties become further excellent.

The present invention is as a matter of course not limited to the above embodiment. As the diffused reflection generator, the inner lateral surface of the inner housing to be a surface on the light source unit side can be processed into frosted glass, a reflection film can be coated (sputtered) on the inner lateral surface, and furthermore, a reflection tape can be adhered. Moreover, the light sources can be constructed so as to make light enter the light guide from a direction inclined with respect to the longitudinal direction thereof.

Also, as the light scatteror provided on the light entering portion of the light guide, it is also possible to form an uneven portion on the light entering portion.

Furthermore, it is also possible to make light from the light source incident from one longitudinal end portion of the light guide while forming a diffused reflection surface applied with a diffused reflection generator at the other longitudinal end portion, and to make the light entered from the one end portion reflect via the diffused reflection surface.

What is claimed is:
1. A turn lamp, comprising:
a base housing long in a lateral direction;
a light source unit, long in the lateral direction, incorporated with a light source and housed in the base housing;
an inner housing, long in the lateral direction, incorporated into the base housing, the inner housing comprising a light guide, long in the lateral direction;
a lens cover, long in the lateral direction, the lens cover covering the base housing; and
a diffused reflection generator, wherein:
the light guide includes a body portion light guide, long in the lateral direction, so as to radiate a light forward, a shape of the radiated light being long in the lateral direction; a bent portion light guide that leaks a light outward in the lateral direction of the turn lamp; and a step portion light guide provided between the body portion light guide and the bent portion light guide, the step portion light guide being stepped such that a space between the bent portion light guide and the base housing is wider than a space between the body portion light guide and the base housing;
the light source includes a light source for the bent portion light guide positioned between the bent portion light guide and the base housing, a light radiation direction of the light source for the bent portion light guide facing a direction in which the light leaks from the bent potion light guide outward in the lateral direction; and a light source for the body portion light guide positioned at a place between the bent portion light guide and the base housing, the place also being positioned between the light source for the bent portion light guide and the step portion light guide, a light radiation direction of the light source for the body portion light guide facing a length direction of the body portion light guide via the step portion light guide, and the diffused reflection generator is structured such that the light from the light source for the body portion light guide is diffusely reflected and leaks out long in the lateral direction from body portion the light guide toward a front part of a vehicle.

2. The turn lamp according to claim 1, wherein the diffused reflection generator is constructed by forming a non-smooth surface on a surface of the light guide on a disposition side of the light source unit.

3. The turn lamp according to claim 1, wherein the diffused reflection generator is constructed by forming a reflection film on a surface of the light guide on a disposition side of the light source unit.

4. The turn lamp according to claim 1, wherein the light source for the bent portion light guide is disposed in an inclined manner with respect to a surface of the bent portion light guide.

5. The turn lamp according to claim 1, wherein the diffused reflection generator is constructed by forming the light guide in a curved shape.

6. The turn lamp according to claim 1, wherein, for the inner housing, integrally formed are the light guide and an extended portion that is extended in a direction orthogonal to a longitudinal direction of the inner housing.

7. The turn lamp according to claim 1, wherein, for the light guide, a light scatteror is provided at, at least, one longitudinal end portion.

8. The turn lamp according to claim 7, wherein the light scatteror is constructed by forming a light entering portion in a spherical shape.

9. The turn lamp according to claim 1, wherein the body portion light guide is solid and semicircular-shaped.

10. A door mirror, comprising:
a mirror;
a turn lamp; and
a body that incorporates the mirror and the turn lamp, the turn lamp being bent rearward from a forwardly bulging portion of the body so as to be long and extend toward end portions in a lateral direction, wherein the turn lamp includes:
a base housing long in the lateral direction;
a light source unit, long in the lateral direction, incorporated with a light source and housed in the base housing;
an inner housing, long in the lateral direction, incorporated into the base housing, the inner housing comprising a light guide, long in the lateral direction;
a lens cover, long in the left and right direction, the lens cover covering the base housing; and
a diffused reflection generator, wherein:
the light guide includes a body portion light guide long in the lateral direction so as to radiate a light forward, a shape of the radiated light being long in the lateral direction; a bent portion light guide that leaks a light outward in the lateral direction of the turn lamp; and a step portion light guide provided between the body portion light guide and the bent portion light guide, the step portion light guide being stepped such that a space between the bent portion light guide and the base housing is wider than a space between the body portion light guide and the base housing,
the light source includes a light source for the bent portion light guide positioned between the bent portion light guide and the base housing, a light radiation direction of the light source for the bent portion light guide facing a direction in which the light leaks from the bent portion light guide outward in the lateral direction; and a light source for the body portion light guide positioned at a place between the bent portion light guide and the base housing, the place also being positioned between the light source for the bent portion light guide and the step portion light guide, a light radiation direction of the light source for the body portion light guide facing a length direction of the body portion light guide via the step portion light guide, and
the diffused reflection generator that is structured such that the light from the light source for the body portion light guide is diffusely reflected and leaks out long in the lateral direction from the body portion light guide toward a front part of a vehicle.

11. The door mirror according to claim 10, wherein the diffused reflection generator is constructed by forming a non-smooth surface on a surface of the light guide on a disposition side of the light source unit.

12. The door mirror according to claim 10, wherein the diffused reflection generator is constructed by forming a reflection film on a surface of the light guide on a disposition side of the light source unit.

13. The door mirror according to claim 10, wherein the light source for the bent portion light guide is disposed in an inclined manner with respect to a surface of the bent portion light guide.

14. The door mirror according to claim 10, wherein the diffused reflection generator is constructed by forming the light guide in a curved shape.

15. The door mirror according to claim 10, wherein, for the inner housing, integrally formed are the light guide and an extended portion that is extended in a direction orthogonal to a longitudinal direction of the inner housing.

16. The door mirror according to claim 10, wherein, for the light guide, a light scatteror is provided at, at least, one longitudinal end portion.

17. The door mirror according to claim 16, wherein the light scatteror is constructed by forming a light entering portion in a spherical shape.

18. The door mirror according to claim 10, wherein the body portion light guide is solid and semicircular-shaped.

* * * * *